United States Patent [19]

Golser et al.

[11] 4,176,217

[45] Nov. 27, 1979

[54] PROCESS FOR THE MANUFACTURE OF FOAMED PLASTICS WITH IMPROVED COMBUSTION CHARACTERISTICS

[75] Inventors: Leopold Golser, Leonding; Hubert Czepel; Gernard Stern, both of Linz, all of Austria

[73] Assignee: Chemie Linz Aktiengesellschaft, Austria

[21] Appl. No.: 895

[22] Filed: Jan. 4, 1979

Related U.S. Application Data

[63] Continuation of Ser. No. 819,503, Jul. 26, 1977, abandoned.

[30] Foreign Application Priority Data

Jul. 30, 1976 [DE] Fed. Rep. of Germany ....... 2634418

[51] Int. Cl.² .............................................. C08J 9/00
[52] U.S. Cl. ................................... 521/106; 521/121; 521/126; 521/127; 521/129; 521/130; 521/137; 521/187; 521/188
[58] Field of Search ........................ 521/106, 137, 121

[56] References Cited

U.S. PATENT DOCUMENTS

| | | | |
|---|---|---|---|
| 2,806,006 | 9/1957 | Proctor | 260/2.5 AM |
| 3,632,531 | 1/1972 | Rush | 260/2.5 AM |

FOREIGN PATENT DOCUMENTS

| | | | |
|---|---|---|---|
| 1918181 | 8/1970 | Fed. Rep. of Germany | 260/2.5 BE |
| 908303 | 10/1962 | United Kingdom | 260/2.5 BE |
| 1029963 | 5/1966 | United Kingdom . | |

*Primary Examiner*—Morton Foelak
*Attorney, Agent, or Firm*—Wenderoth, Lind & Ponack

[57] ABSTRACT

Production of foamed plastics with improved combustion characteristics by condensing aqueous solutions of aminoplast precondensates with at least bifunctional organic isocyanate whereby an acid curing catalyst and an accelerator for polyurethane formation is used. For performing the condensation, the aqueous solution of the precondensate is added to the mixture of isocyanate and the accelerator at the same time as but separately from the acid curing catalyst.

7 Claims, No Drawings

PROCESS FOR THE MANUFACTURE OF FOAMED PLASTICS WITH IMPROVED COMBUSTION CHARACTERISTICS

This is a continuation of application Ser. No. 819,503, filed July 26, 1977, now abandoned.

The subject of the present invention is the manufacture of foamed plastics with improved combustion characteristics by a condensation reaction of aqueous solutions of aminoplast precondensates with organic isocyanates, which are at least bifunctional, by the action of catalyst combinations consisting of "acid" and "basic" catalysts, as well as, optionally, organic metal compounds, especially the tin salts of organic acids.

Processes for the manufacture of aminoplast precondensates with the aim of combining the good properties of the two types of plastics, that is to say the aminoplasts and the polyurethane plastics, with one another are already known.

Thus, for example, according to U.S. Pat. No. 3,632,531, polyurethane foams are obtained by a condensation reaction from organic polyisocyanates and so-called "methylol resins", that is to say aminoplast precondensates, under the catalytic action of organic tin salts and secondary or tertiary amines. The disadvantage is that water content of the reaction system in this process and in the other similar processes known hitherto should be far below 10% and this means that aminoplast precondensate solutions which, by reason of their industrial manufacture, contain considerable amounts of water have first to be evaporated before they are used. Furthermore, after-curing is necessary in order to achieve optimum flame resistance and the necessary mechanical strength. On the other hand, acid compounds are regarded as condensation retarders for polyurethanes (see for example, Kunststoff-Handbuch (Plastics Handbook) Carl Hanser-Verlag, volume X, 1966, page 151).

Furthermore, according to DT-OS No. 1,918,181, the manufacture of foams from urea/formaldehyde or melamine/formaldehyde dynamic but above all phenol/formaldehyde resins, by reaction with isocyanates in two stages is known, the formaldehyde resin first being produced in the presence of acid catalysts and in the presence of a blowing agent, such as fluorinated hydrocarbons, and the isocyanate being added only subsequently. Since, as is known, urea/formaldehyde, melamine/formaldehyde and phenol/formaldehyde resins rapidly undergo a complete condensation reaction in an acid medium, only a few OH groups are still available for the reaction with isocyanate in a process of this type, so that uniform distribution of the formaldehyde resin and polyurethane elements in the condensation product can no longer be achieved.

It has now been found, surprisingly, that it is possible to manufacture, from aminoplast precondensates and polyisocyanates, light foams which, apart from the $CO_2$ supplied by the reaction of polyisocyanate with water, require no further foaming agent, if the aminoplast component is employed as an aqueous solution of a water-soluble precondensate, the amount of polyisocyanate is so chosen that both a significant condensation reaction takes place with the precondensate and an optimum blowing reaction takes place with water and if certain combinations of acid and basic or metal-organic catalysts are employed, it being necessary to adhere to certain rules for the addition of the latter. In this way it is possible to produce foams which have good combustion and insulating characteristics, and which cure tack-free without further heat after-treatment, in an economical manner, in a single process step and with short manufacturing times.

The subject of the invention is, thus, in a process for the production of foamed plastics with improved combustion characteristics by a condensation reaction of aminoplast precondensates with organic isocyanates which are at least bifunctional in the presence of acid curing catalysts and an accelerator for polyurethane formation selected from the group consisting of tertiary amines and tin salts with metalorganic bonds the improvement which comprises using as starting material an aqueous solution of a water-soluble aminoplast precondensate of formaldehyde and an aminoplast forming compound selected from the group consisting of urea and melamine, the solution having a water content of 13 to 40% by weight, adding this aqueous solution to the organic isocyanate which is already mixed with the accelerator for polyurethane formation, being used in an amount of 0.5 to 5% by weight, relative to the foamable mixture and adding at the same time as the aqueous solution of the aminoplastprecondensate but separately from it the acid curing catalyst, also being used in an amount of 0.5–5% by weight, relative to the foamable mixture, whereby the ratio of water to organic isocyanate prior to the start of the reaction is 0.14 to 1.5 parts per weight water to 1 part per weight of organic isocyanate.

In the sense of the present invention, aminoplast precondensates are to be understood as all water-soluble N-methylol compounds which are known as starting materials for urea and/or melamine-formaldehyde resins and are marketed under a number of trade names. These precondensates are those which either have unlimited solubility or at least are soluble in the amount of water according to the invention, that is to say they are relatively low-molecular condensation products with free methylol groups, such as are obtained, for example, from condensation reactions at pH values from the neutral point to weakly alkaline. For typical examples see, for example, Houben-Weyl, Methoden der organischen Chemie (Methods of Organic Chemistry), Georg Thieme-Verlag, volume 14, page 348 et seq. (Melamine). With regard to the number of methylol groups, the aminoplast component should contain at least one $CH_2OH$ group per molecule and on average two such groups per molecule are desirable. With regard to the molar ratio formaldehyde:aminoplast-forming agent, this should be 1.2 to 2.5 and preferably 1.5 to 2.1:1 when urea is used. In the case of melamine it should be 1.8 to 4.0

5. preferably 2.0 to 3.0:1. In all cases, however, a large excess of formaldehyde would be unfavourable but the H atoms in all the NH groups can be replaced by $CH_2OH$ groups. Moreover, reference is made to the numerous variants for the manufacture of these precondensates 6. regard to the setting of the pH and the reaction temperatures, such as are also indicated in Kunststoff-Handbuch (Plastics Handbook), 1966, Carl Hanser-Verlag, volume X, page 151 et seq.. Thus, within the scope of the manufacturing processes described, it is possible to vary the set pH within relatively wide limits. Within the framework of the illustrations given above, the molar ratio is also not critical, that is to say it is possible within the scope of the process according to the invention to use all the commercially available precondensates obtained from formaldehyde on the one hand and urea or melamine on the other hand. The lighter the foam to be manufactured is to be, the lower should be the degree of condensation of the particular precondensates employed, that is to say when formaldehyde/urea precondensates are employed dimethylolurea will, for example, also be used as a starting material. The water content of the precondensate solutions is important inasmuch as it should, on the one hand, be adequate to give, with the isocyanate, the bulk of which is intended to react with the aminoplast precondensate, $CO_2$ in an amount such that a "chemical" blowing effect which is just adequate takes place; nanosecond the other hand, the water content may not be so high that the foam which is formed collapses again.

In this sense, the ratio of water to isocyanate should be from 0.14 to 1.5 parts by weight:1. If necessary, a foam with good mechanical properties can still be obtained by the addition of polyols, such as, for example, commercially available polyester-polyols, to a reaction mixture which contains a relatively large amount of water, so that in such cases relatively high water contents in the precondensates can be tolerated. In general, the water contents between 13 and 40% by weight, relative to the aqueous precondensate solution.

with regard to the organic isocyanates which are to be reacted with the aminoplast precondensates, it is possible, in principle, because of their known high reactivity, to use all those which are known in the literature and especially those which have already been described as foam components. Compounds of this type are, for example, mentioned in even more detail in U.S. Pat. No. 2,906,986. However, for reasons of economy and industrial accessibility, those such as 2,4- and 2,6-tolylene diisocyanate ("TDI") and 4,4′diphenylmethane diisocyanate ("MDI"), which may be in the crude form, and polyphenylene polymethylene isocyanate ("PAPI") are preferred. In various information leaflets, these products are characterised by their NCO content, their viscosity and the like. If isomers are possible, as, say, in the case of tolylene diisocyanate, the isomer ratio is usually also indicated.

These specifications are sufficient to enable those skilled in the art to use these compounds within the scope of the present process.

The weight ratio of aminoplast precondensate to isocyanate is also important for carrying out the process according to the invention and this ratio must be so chosen that, under the action of the catalyst combinations according to the invention, on the one hand an optimum condensation reaction takes place between the reactants but also, on the other hand, the blowing reaction, that is to say the reaction of the isocyanate with the water present from the aminoplast precondensate solution with the evolution of amounts of $CO_2$ which are just adequate for satisfactory foam formation proceeds in an optimum manner.

It has been found that the object according to the invention is most likely to be achieved with a ratio of 12–330% by weight and preferably of 17–50% by weight, based on the arithmetical solids content of the aminoplast precondensate solution.

With regard to the catalysts to be employed according to the invention, these are in themselves already known as reaction accelerators in plastics chemistry and above all in aminoplast chemistry and polyurethane chemistry. Thus, acid catalysts such as mineral acids, acid chlorides or organic compounds which form strong acids with water have long been used for the condensation reaction of aminoplast precondensates. Tertiary amines, such as, above all, triethanolamine, triethylamine, dimethylethanolamine and 1,4-diazabicyclo-(2,2,2)-octane, have long been used when manufacturing polyurethane plastics from the corresponding isocyanates and polyols. Amongst the known amines, all the tertiary amines are especially suitable, whilst the primary and secondary amines can lose their activity by reaction with the polyisocyanates. In all cases, the amount of the catalysts employed is between 0.5–5% by weight, relative to the foamable mixture. Organic metal compounds, such as the tin salts of the fatty acids with metal-organic bonds, for example dibutyl-tin dilaurate, are, if necessary, also used together with the tertiary amines in order to manufacture polyurethane and in the presence of water these compounds also promote the formation of $CO_2$. Summaries on all the catalysts which in principle can also be used in the process according to the invention can be taken from the specialist literature (see, for example, Kunststoff-Handbuch (Plastics Handbook), volume VII, Carl Hanser-Verlag, 1966, page 113 or Kunststoff-Handbuch (Plastics Handbook), volume X, "Duroplaste" ("Thermosetting plastics"), Carl Hanser-Verlag, page 151, 1966).

It is surprising that the said groups of catalysts are jointly active in a system consisting of aminoplast precondensates, water and an organic isocyanate, which is at least bifunctional, and, if necessary, also polyols without mutually inhibiting one another. Their use at virtually the same time leads, rather, to the three reactions which lead to the formation of the solid foam proceeding at the same time in an optimum manner. These reactions are: the reaction of the polyisocyanate with the aminoplast precondensate, the polycondensation reaction in the aminoplast resin part itself and the reaction of the polyisocyanate with the water introduced with the aminoplast precondensate solution. Of course, a balanced course of reaction of this type is particularly important when manufacturing light foams.

However, mixing of the aminoplast precondensate with the acid cayalyst in the absence of the isocyanate component should be avoided because the curing of the aminoplast component on its own is immediately initiated by this means and this could lead to difficulties, especially when manufacturing very light foams, and make it necessary to employ large amounts of physical blowing agents.

Fillers and pigments, flameproofing agents, foam stabilisers and other customary fillers can also be added. The use of physical blowing agents is, of course, possible.

The examples which follow are intended to illustrate the process according to the invention without restricting it. Transfer of the experiments indicated to foaming machines of diverse types is readily possible after preliminary experiments.

EXAMPLE 1

150.0 g of an 85% strength aqueous solution of methylolated urea with a molar ratio of formaldehyde:urea = 1.5 were added at the same time as, but separately from, 5.0 g of benzoyl chloride to a mixture, which had been prepared immediately beforehand, of 50.0 g of crude diphenylmethane diisocyanate (Desmodur 44 V 107, 2.0 g of silicone oil as a foam stabiliser (DC 193), 4.0 g of triethanolamine, 0.50 g of dimethylethanolamine and 0.10 g of diazabicyclooctane and the whole was intensively mechanically mixed for 10 seconds at room temperature in a laboratory vessel. The foam formed from this mixture had the following data:
Start time: 25 seconds
Rise time: 45 seconds
Tack-free: after light=seconds
Density: 30 kg/m$^3$ If, using the same procedure, the molar ratio of formaldehyde:urea is changed from 1.5 to 1.9, foams which have a density of 13 kg/m$^3$ are obtained with a somewhat longer rise time and tack-free time.

EXAMPLE 2

150.0 g of a 60% strength by weight aqueous solution of methylolated urea with a molar ratio of formaldehyde:urea of 2.0 were added at the same time as, but separately from, 5.0 g of benzoyl chloride to a mixture, which had been prepared immediately beforehand, of 50 g of crude diphenylmethane diisocyanate (Desmodur 44 V 10), 2.0 g of silicone oil (foam stabiliser DC 193), 4.0 g of triethanolamine, 0.50 g of dimethylethanolamine and 0.10 g diazabicyclooctane and the whole was stirred intensively for 10 seconds at room temperature under laboratory conditions.
Start time: 21 seconds
Rise time: 161 seconds
Tack-free after: 180 seconds
Density: 30 a kg/m$^3$

EXAMPLE 3

260 g of an 85% strength by weight aqueous solution of methylolated urea, molar ratio of formaldehyde:urea=1.90, were added together with 5.00 g of benzoyl chloride to a mixture, which had been prepared immediately beforehand, of 50.0 g of diphenylmethane diisocyanate (Desmodur 44 V 10), 2.00 g of silicone oil (DC 193), 4.00 g of triethanolamine, 0.50 g of dimethylethanolamine and 0.10., g of diazabicylooctane and the whole was intensively stirred mechanically for 10 seconds at room temperature.
Start time: 29 seconds
Rise time: 79 seconds 6-inch
Tack-free after: 79 seconds adjusted
Density: 19 kg/m$^3$ If 400 g of an 85% strength by weight aqueous solution of methylolated urea are used as the starting material and in other respects the procedure is analogous, a foam which has a density of 30 kg/m$^3$ is obtained with the same foaming data.

EXAMPLE 4

200 g of an 85% strength by weight aqueous solution of methylolated urea, molar ratio of formaldehyde:urea=1.90, were added at the same time as, but separately from, 5.0 g of benzoyl chloride to a mixture, which had been prepared immediately beforehand, of 60 g of crude diphenylmethane diisocyanate (Desmodur 41 V 10), 2.0 g of silicone oil (DC 193), 4.00 g of triethanolamine and 0.6 g of dimethylcyclohexylamine and the whole was stirred intensively for 10 seconds at room temperature in the laboratory.
Start time: 24 seconds
Rise time: 171 seconds in the example.
Tack-free after: 171 seconds
Density: 16 kg/m$^3$

EXAMPLE 5

A mixture of 1,000.0 g of Formurea (water content about 15%), 150 g of urea and 199.7 g of melamine was heated, at an approximately neutral pH, to about 80°-90° C. until a clear solution formed.

150.0 g of the solution, which was slightly turbid after cooling, were added in a laboratory vessel at room temperature at the same time as, but separately from, 2.5 g of benzoyl chloride to a mixture of 50.0 g of crude diphenylmethane diisocyanate, 3.0 g of foam stabiliser (DC 193), 4.0 g of triethanolamine, 0.50 g of dimethylethanolamine and 0.10 g of diazabicyclooctane. The foam formed from this mixture had the following data:
Start time: 20 seconds
Rise time: 74 seconds
Tack-free after: 2 minutes
Density: 26 kg/m$^3$

EXAMPLE 6

300 g of an 85% strength solution of methylolated urea, molar ratio of formaldehyde:urea=1.9, and 4.0 g of benzoyl chloride were added at the same time, but separately, to a mixture of 25.0 g of polyisocyanate (Desmodur 44 V 10), 1.00 g of foam stabiliser (DC 193), 2.0 g of triethanolamine and 0.05 g of diazabicyclooatane and the whole was mixed mechanically for 10 seconds at room temperature. The foam formed from this mixture had the following data:
Start time: 25 seconds
Rise time: 75 seconds
Tack-free after: 120 seconds
Density: 109 kg/m$^3$

EXAMPLE 7

150 g of 85% strength aqueous solution of methylolated urea, molar ratio of formaldehyde:urea=1.9, and 5.00 g of benzoyl chloride are added at the same time, but separately, to a mixture of 50.0 g of polyisocyanate (Desmodur 44 V 10), 3.00 g of foam stabiliser (DC 193), 3.00 g of triethanolamine and 0.40 g of dibutyl-tin dilaurate (Niax D 22) and the whole was mixed intensively for 10 seconds at room temperature. The foam formed from this mixture had the following data:
Start time: 14 seconds
Rise time: 65 seconds
Tack-free after: 65 seconds
Density: 20 kg/m$^3$

EXAMPLE 8

200 g of an 85% strength aqueous solution of methylolated urea, molar ratio of formaldehyde:urea=1.9, and 20.0 g of 42% strength phosphoric acid were added at the same time to a mixture of 50.0 g of polyisocyanate (Desmodur 44 V 10), 3.00 g of foam stabiliser (DC 193), 4.00 g of triethanolamine and 0.60 g of dimethylethanolamine and the whole was mixed intensively for 10 seconds at room temperature. The foam formed from this mixture had the following data:
Start time: 9 seconds
Rise time: 51 seconds
Tack-free after: 51 seconds
Density: 60 kg/m$^3$

EXAMPLE 9

200.0 g of an approximately 85% strength by weight aqueous solution of methylolated urea, molar ratio of formaldehyde:urea=1.9, were added at the same time as, but separately from, 3.14 g of benzenesulphonyl chloride to a mixture, which had been prepared immediately beforehand, of 50.0 g of polyisocyanate (Desmodur 44 V 20), 3.0 g of foam stabiliser (DC 193), 4.00 g of triethanolamine and 0.60 g of dimethylethanolamine and the whole was mixed intensively for 10 seconds at room temperature.

Start time: 13 seconds
Rise time: 162 seconds
Tack-free after: approximately 300 seconds
Density: 33 kg/m$^3$

EXAMPLE 10

200.0 g of an 85% strength by weight aqueous solution of methylolated urea, molar ratio of formaldehyde:urea = 1.9, are added at the same time as, but separately from, 5.00 g of benzoyl chloride to a mixture of 40.0 g of crude di phenylmethane diisocyanate (Desmodur 44 V 10), 10.0 g of toluylene diisocyanate, 3.0 g of foam stabiliser (DC 193), 4.0 g of triethanolamine and 0.60 g of dimethylethanolamine and the whole is mixed intensively for 10 seconds at room temperature.

Start time: 16 seconds
Rise time: 79 seconds
Tack-free after: 79 seconds
Density: 23 kg/m$^3$ According to ASTM-1692-59 T, all the foams were self-extinguishing.

What we claim is:

1. In a process for the production of foamed plastics with improved combustion characteristics by a condensation reaction of aminoplast precondensates with organic isocyanates with at least two isocyanate groups, in the presence of acid curing catalysts and an accelerator for polyurethane formation selected from the group consisting of tertiary amines and tin salts with metal-organic bonds, the improvement which consists essentially of: conductance passive
  using as starting material an aqueous solution of a water-soluble aminoplast precondensate of formaldehyde and urea, the solution having a water content of 13 to 40% by weight;
  adding this aqueous solution to the organic isocyanate which is already mixed with the accelerator for polyurethane formation, said accelerator being used in an amount of 0.5 to 5% by weight, relative to the foamable mixture;
  adding to said organic isocyanate/accelerator mixture, at the same time as the aqueous solution of the aminoplast precondensate is added to the isocyanate/accelerator mixture, but separately from said solution of the aminoplast precondensate, the acid curing catalyst, said catalyst being used in an amount of 0.5-5% by weight, relative to the foamable mixture;
  the proportion of isocyanate in the reaction mixture being 12 to 330% by weight, relative to the arithmetical solids content of the aqueous solution of the aminoplast precondensate;
  whereby the ratio of water to organic isocyanate prior to the start of the reaction is 0.14 to 1.5 parts per weight water to 1 part per weight of organic isocyanate.

2. A process according to claim 1, in which the molar ratio of formaldehyde:urea in the aminoplast precondensate is 1.2 to 2.5:1.

3. A process according to claim 1, in which the molar ratio of formaldehyde:urea in the aminoplast precondensate is 1.5 to 2.1

4. A process according to claim 1, in which the organic isocyanate used is tolylene-diisocyanate.

5. A process according to claim 1, in which the organic isocyanate used is diphenylmethane diisocyanate.

6. A process according to claim 1, in which the proportion of isocyanate in the reaction mixture is 17 to 50% per weight relative to the arithmetical solids content of the aqueous solution of the aminoplast precondensate.

7. A process according to claim 1, in which the acid curing catalyst is selected from the group consisting of phosphoric acid, benzoylchloride and para-toluene sulphonyl chloride.

* * * * *